(12) United States Patent
Ray et al.

(10) Patent No.: US 6,193,391 B1
(45) Date of Patent: Feb. 27, 2001

(54) MODULAR LAMP ASSEMBLY AND METHOD OF ASSEMBLING SAME

(75) Inventors: Karl E. Ray, Bedford; Rolland B. Hall, Keene; Scott M. Hardenstine, Londonderry; Peter A. Dudek, Manchester, all of NH (US)

(73) Assignee: Osram Sylvania Inc., Danvers, MA (US)

(*) Notice: Subject to any disclaimer, the term of this patent is extended or adjusted under 35 U.S.C. 154(b) by 0 days.

(21) Appl. No.: 09/028,808

(22) Filed: Feb. 24, 1998

(51) Int. Cl.[7] ..................................................... F21V 23/02
(52) U.S. Cl. ..................... 362/221; 362/221; 362/330; 313/17; 313/493
(58) Field of Search ........................... 362/227, 221, 362/222, 310, 311; 313/493, 17, 477 R, 417

(56) References Cited

U.S. PATENT DOCUMENTS

| | | | |
|---|---|---|---|
| 2,295,788 | * 9/1942 | Hoeveler | 362/221 |
| 3,808,495 | * 4/1974 | Win | 313/110 |
| 4,639,841 | * 1/1987 | Salestrom et al. | 362/227 |
| 5,412,551 | 5/1995 | Newell . | |
| 5,473,522 | * 12/1995 | Kriz et al. | 362/221 |
| 5,806,967 | * 9/1997 | Soorus et al. | 362/223 |

FOREIGN PATENT DOCUMENTS 0 760 449 A1    3/1997   (EP) .

* cited by examiner

*Primary Examiner*—Sandra O'Shea
*Assistant Examiner*—Bertrand Zeade
(74) *Attorney, Agent, or Firm*—William E. Meyer

(57) ABSTRACT

A modular lamp assembly and method of assembling same is provided. The modular lamp assembly includes a lamp/ballast subassembly and a reflector which is positioned in a space provided between the lamp and the ballast. The reflector is unassembled in relation to the lamp and the ballast so that if the lamp or ballast are defective, the reflector may be readily removed from the subassembly and placed between a lamp and ballast of a replacement subassembly. The lamp/ballast subassembly, including the reflector, are held in place within a housing by sandwiching the ballast and the reflector between interior surfaces of the housing and a housing cover which contains an opening aligned with the lamp.

21 Claims, 2 Drawing Sheets

MODULAR LAMP ASSEMBLY AND METHOD OF ASSEMBLING SAME

TECHNICAL FIELD

The present invention relates to a modular lamp assembly which includes an integrated disposable sub-miniature fluorescent lamp/ballast subassembly. The modular lamp assembly is useful, without limitation, in motor vehicle applications.

BACKGROUND ART

It is known to provide lighting for vehicles. For example, it is known to provide incandescent lighting systems for use in the interior of a motor vehicle. One disadvantage of such incandescent lighting systems is that there is a tendency for such systems to provide inefficient power conversion to visible light. For example, current incandescent lamps in such lighting systems only produce about 4 lumens per watt. In addition, the cost of the electrical support system for use with such incandescent lighting systems tends to be relatively high due to the large current draw which each incandescent lamp requires in order to produce adequate light output. For example, it is presently estimated that due to the required increase in alternator output and increase in wire size to accommodate existing incandescent lamps, the cost per watt is about $0.42. Present incandescent lamps use about 12 watts per lamp. Another problem with existing incandescent lamps of the type provided for use with a motor vehicle is that such lamps include a filament which tends to fail when subjected to the extreme vibration and mechanical shock prevalent in motor vehicle applications.

One disadvantage when considering the fabrication and maintenance of incandescent lighting systems presently used inside motor vehicles, is that such systems tend to include multiple components that are not interchangeable and are not necessarily optimized to each other. Each such system includes several parts which are usually custom manufactured for each application.

Efforts to replace incandescent lighting systems for vehicle interior apparatus with filamentless, discharge lighting systems have also incurred problems. Presently, filamentless, discharge lighting systems require a lamp, a ballast and interconnecting wiring. Although such systems tend to be efficient and robust in a vibrating environment such as is incurred in motor vehicle applications, such systems require up to 1500 volts to start and several hundred volts for continued operation. Extreme care is required when installing such a system in order to prevent dangerous exposure to such high voltage to the automotive technician and the end consumer. For saftey, the electronic ballast may include additional circuits to sense an open circuit, or an excessive current draw, and shut down the system down or otherwise respond to protect the system, the automotive technician and the end consumer. In addition, the lamp and the ballast must be tuned to each other in each application for optimum performance and minimization of EMI. Typically, the lamp is sold separately and a system integrator is required to attach the lamp to the electronic ballast package for satisfactory operation. Another problem is that in some applications the filamentless discharge lamps in each vehicle are mounted at a remote location relative to the electronic ballast package the result of which is to increase the potential for electric shock hazard and electromagnetic interference.

DISCLOSURE OF THE INVENTION

It is an object of the present invention to provide an improved integrated modular lamp assembly and method of assembling same.

It is a further object of the present invention to provide a modular lamp assembly having long life, high lumen output and robust discharge lighting.

It is another object of the present invention to provide a modular lamp assembly having reduced cost.

It is yet another object of the present invention to provide a disposable modular lamp assembly.

It is yet a further object of the present invention to provide a modular lamp assembly comprising a disposable lamp/ballast subassembly.

Yet another object of the present invention is to provide a modular lamp assembly which is maintenance free.

A further object of the present invention is to provide a modular, pre-tuned stand-alone lamp and ballast subassembly.

Another object of the present invention is to provide a modular lamp assembly having improved safety characteristics.

This invention achieves these and other objects by providing a modular lamp assembly, and method of fabricating such an assembly, comprising a lamp, a ballast, a reflector, a housing and a cover. The lamp is electrically attached to the ballast. The reflector is positioned between yet unassembled in relation to the ballast and the lamp. The housing encloses a chamber and includes at least one interior surface. The lamp, ballast and reflector are positioned in the chamber. The interior surface of the housing is structured and arranged to provide support for the ballast and the reflector. The cover includes an opening and is removably attached to the housing such that the lamp faces the opening in the cover.

BRIEF DESCRIPTION OF THE DRAWINGS

This invention may be clearly understood by reference to the attached drawings in which like reference numerals designate like parts and in which.

MODE FOR CARRYING OUT THE INVENTION

Figure 1:
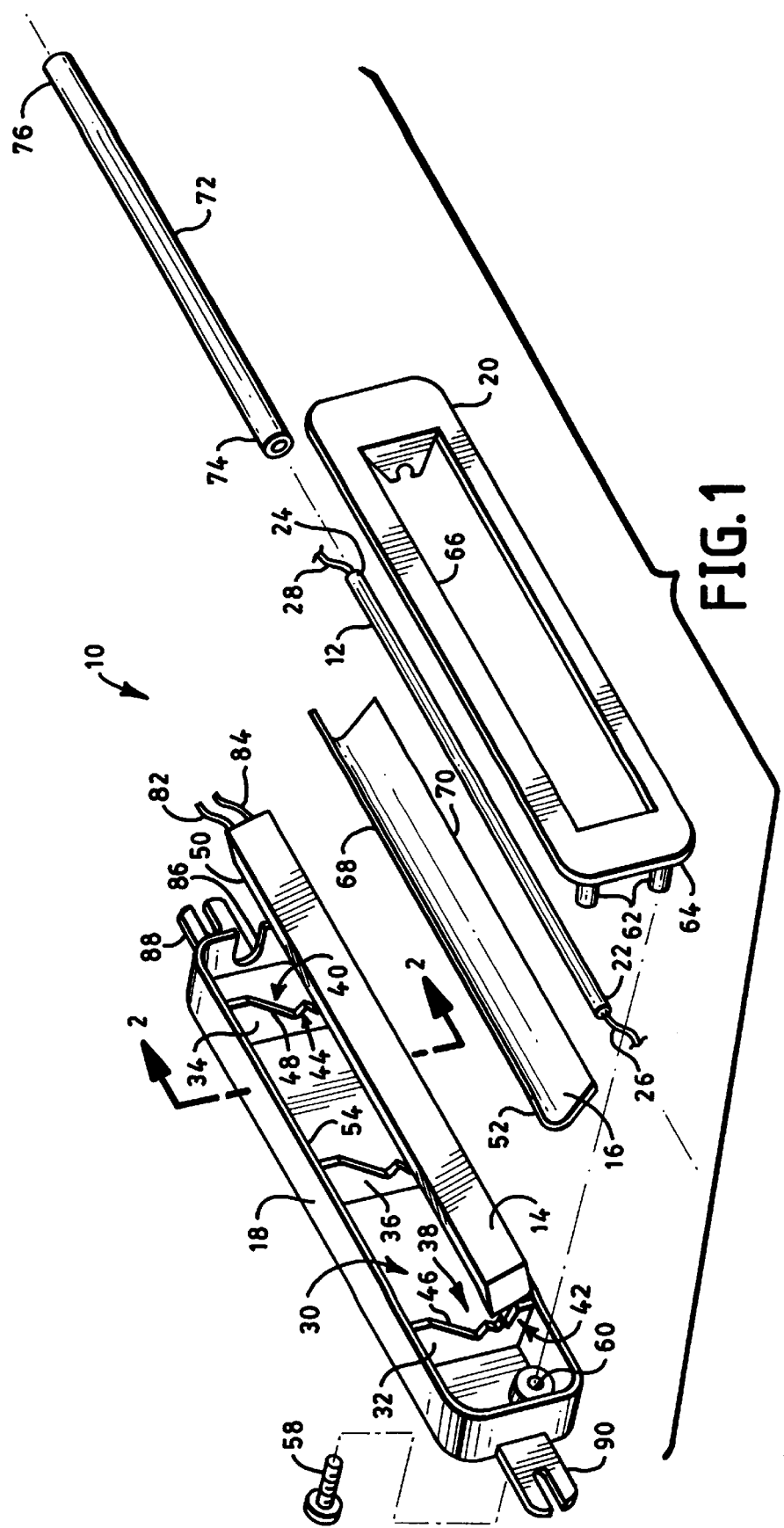
FIG. 1 is an exploded view of one embodiment of a modular lamp assembly of the present invention.

The embodiment of this invention which is illustrated in the drawings is particularly suited for achieving the objects of the invention. In the embodiment illustrated in the drawings, an integrated modular lamp assembly 10 includes an elongated lamp 12, an elongated ballast illustrated diagrammatically at 14, an elongated reflector 16, a housing 18 and a cover 20 for the housing.

Elongated lamp 12 is a conventional sub-miniature filamentless fluorescent lamp. The power conversion of such a lamp is very efficient, producing over 15 lumens per watt, and the cost is relatively low, such lamp using only slightly more than 4 watts per lamp. The lamp extends from a first end 22 to an opposite second end 24 and may be about 12 cm. in length and about one third of a centimeter in diameter. Lamp 12 is a filamentless discharge lamp which is efficient and robust in a vibrating environment. Only about 12.8 volts are required to operate such a sub-miniature lamp and therefore the lamp does not constitute a safety hazard to the automotive technician or the end consumer. Lamp 12 includes leadwires 26 and 28 which extend from first end 22 and second end 24, respectively.

Although the elongated ballast 14 is a conventional ballast in the form of a printed circuit board with the usual ballast components and circuits, in the present invention the electronics of the ballast are integrated with the lamp such that the electrical components of the system are tuned as a lamp/ballast subassembly. In this manner, no maintenance is required, the system being serviceable as a whole by merely replacing a faulty lamp/ballast subassembly with a new one. By using a replacement lamp/ballast subassembly rather than individually replacing a faulty lamp or ballast, on-site tuning of a new lamp with an existing ballast is not required, there being no need for a system integrator to match a lamp to an electronic package to obtain satisfactory operation. The leadwires 26 and 28 are electrically and mechanically connected to the circuit (not shown) of the ballast 14 in a conventional manner. However, rather than providing lengthy leadwires as in prior art devices, the lamp 12 may be spaced from the ballast a short distance by the leadwires 26, 28 which may be only about 1 cm. in length.

The elongated reflector 16 is positioned between the lamp 12 and the ballast 14. It will be noted that the reflector 16 is unassembled in relation to the lamp 12 and the ballast 14 by which is meant that the length of the reflector 16 is inserted between the length of the lamp and the length of the ballast but is not attached thereto. In other words, the reflector 16 is free-floating in relation to the lamp 12 and the base 14. In this manner, if the lamp 12 or ballast 14 fail to operate satisfactorily and require replacement, the reflector 16 may be readily removed from between the disposable lamp 12 and ballast 14 subassembly and inserted between a replacement lamp and ballast which form a replacement lamp/ballast subassembly. Alternatively, the cost of the housing 18, cover 20 and the lamp/ballast/reflector subassembly contained therein as described below is sufficiently low that the entire modular lamp assembly 10 may be replaced if the lamp 12 or ballast 14 fail to operate satisfactorily. To this extent, the entire modular lamp assembly 10 may be considered disposable, the lamp/ballast subassembly therefore being maintenance free.

A housing is provided to contain the lamp, ballast and reflector assembled in the manner described above. Such housing encloses a chamber and includes at least one interior surface which is structured and arranged to provide support for the ballast and reflector of the present invention. In a preferred embodiment, such interior surface mates with the ballast and the reflector. For example, in the embodiment illustrated in the drawings, a plastic housing 18 encloses a chamber 30 and includes a first extension 32 which extends from a portion of a rear inner wall of the housing into the chamber 30, and a second extension 34 which extends from another portion of such rear inner wall into the chamber. If desired, a similar third extension 36 may be provided between extensions 32 and 34. First extension 32 and second extension 34 include a first interior surface 38 and a second interior surface 40, respectively. With reference to FIG. 1, it will be noted that the first interior surface 38 and second interior surface 40 include first segments 42 and 44, respectively, and second segments 46 and 48 respectively. The first extension 32 and the second extension 34 are constructed and arranged to engage and conform to or otherwise mate with the ballast 14 and reflector 16. In particular, the first segments 42 and 44 mate with a rear surface 50 of the printed circuit board of the ballast 14. Similarly, second segments 46 and 48 engage and conform to or otherwise mate with a rear surface 52 of the reflector 16. By configuring the segments 42, 44 and 46. 48 as desired, the ballast 14 and reflector 16 may be supported, as required, and the reflector 16 may be oriented as desired in relation to the front 54 of the housing 18. It will be noted that although the ballast 14 and reflector 16 are supported in place by the interior surfaces 38 and 40 of the first extension 32 and second extension 34, respectively, in the embodiment illustrated in the drawings the lamp, ballast and reflector are unassembled in relation to the housing 18; that is, the lamp, ballast and reflector are not attached to the housing but are held in place relative to the housing when the lamp assembly 10 is assembled as explained hereinafter. In the embodiment illustrated in the drawings, the lamp 12 will be supported in front of the reflector 16 by the leadwires 26 and 28, which are electrically and mechanically connected to the ballast 14 in a conventional manner such as by soldering or welding.

Figure 2:
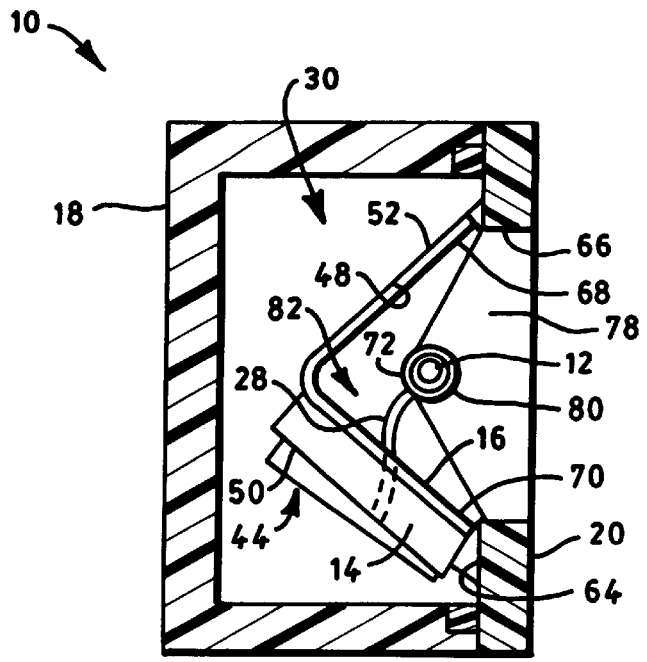
FIG. 2 is a cross-sectional view of FIG. 1 taken along lines 2—2 of FIG. 1.

A plastic cover 20 for the housing 18 is provided to contain the lamp/ballast/reflector subassembly within the chamber 30 of the housing. By way of example only, the cover 20 may be removably attachable to the front 54 of the housing 18 by four screws 58 (only one is illustrated in the drawings) which extend through four respective holes 60 in the rear of the housing. Each hole 60 extends through the rear inner wall of the housing 18 at respective corners of the housing. Screws 58 are threaded into respective apertured bosses 62 extending from an interior surface 64 of the cover 20 at respective interior corners of the cover. The cover 20 includes an opening 66 with which the lamp 12 is aligned when the modular lamp assembly 10 is fully assembled. The interior surfaces 38 and 40 of the extensions 32 and 34, respectively, face opening 66 when the modular lamp assembly 10 is fully assembled. The cover 20 may be constructed and arranged so that the interior surface 64 of the cover bears against the reflector 16 to firmly sandwich the lamp/ballast/reflector subassembly between the cover and the interior surfaces 38 and 40 to hold the ballast 14 and reflector 16 in place and the lamp 12 aligned with the opening 66. To this end, the reflector 16 includes edges 68 and 70 which engage the interior surface 64 as depicted in FIG. 2.

In one embodiment of the present invention an elongated lamp jacket may be provided which prevents the lamp from shattering should the lamp break. For example, in the embodiment illustrated in the drawings, an elongated tubular lamp jacket 72 is provided. Lamp 12 extends through the tubular lamp jacket 72 from one end 74 to an opposite end 76. The first end 22 of the lamp 12 extends from end 74 of the lamp jacket 72 and the second end 24 of the lamp extends from end 76 of the jacket.

Figure 3:
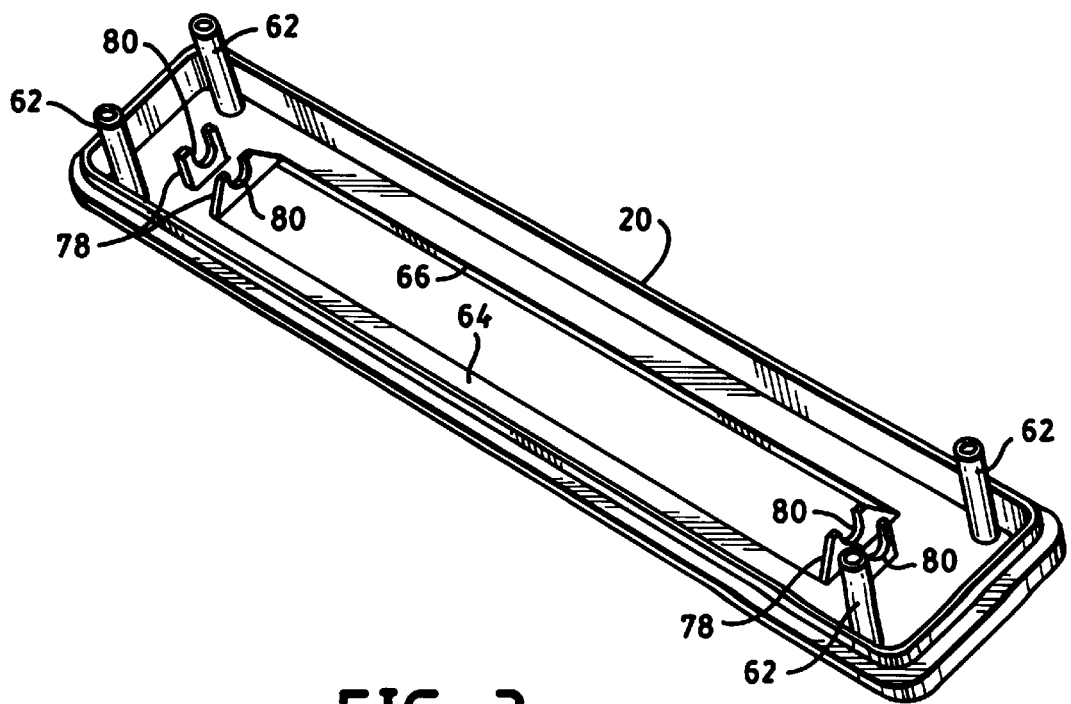
FIG. 3 is a perspective view of a cover of the modular lamp assembly of FIG. 1.

In a preferred embodiment of the present invention, at least one support member extends into the chamber of the housing for support of the lamp jacket. For example, in the embodiment illustrated in the drawings, the cover includes a plurality of support members which extend into the housing chamber from the rear surface of the cover when the lamp assembly is assembled. The lamp jacket is removably attached to such support members and shields the lamp which extends through the lamp jacket. For example, FIG. 3 illustrates cover 20 having four support members 78 which extend from rear surface 64 of the cover. Each support member 78 includes a channel 80 which is configured to receive a length of the lamp jacket 72 and is preferably dimensioned to provide a force fit for such length. In other words, lengths of the lamp jacket 72 may be force fit into respective channels 80 to hold the lamp jacket in place as illustrated in FIG. 2 with respect to one of the support members 78. In the embodiment illustrated in the drawings, the lamp jacket 72 is removably attached to two support members 78 adjacent end 74 of the lamp jacket and to two other support members 78 adjacent opposite end 76 of the lamp jacket. In referring to FIG. 2, it will be noted that the lamp 12 is supported within the cavity 30 by the leadwires of the lamp (only leadwire 28 is shown) which are electrically and mechanically connected to the circuit of the ballast 14.

In considering assembling the modular lamp assembly 10 of the present invention, the two leadwires 26 and 28 of lamp 12 are electrically and mechanically connected to the circuitry of ballast 14 in a conventional manner. For example, the leadwires 26 and 28 may be welded or soldered to the circuitry of the ballast 14. In supporting the lamp 12 in this manner in relation to the ballast 14, a space 82 is provided therebetween as illustrated in FIG. 2. The reflector 16 is positioned in the space 82 such that the reflector extends between the lamp and the ballast. The reflector 16 will be unassembled in relation to the lamp 12 and the ballast 14 so that the reflector may be readily removed from the space 82 should the lamp and ballast need to be replaced. The lamp 12, ballast 14 and reflector 16 form a subassembly which is inserted into the chamber 30 of the housing 18, the ballast and reflector being mated with an interior surface of the housing. In particular, the lamp/ballast/reflector subassembly is inserted into the chamber 30 while mating the rear surface 50 of the printed circuit board of the ballast 14 with the segments 42 and 44 of the interior surfaces 38 and 40, respectively, and mating the rear surface 52 of the reflector 16 with the segments 46 and 48 of the interior surfaces 38 and 40. When the lamp/ballast/reflector subassembly is mated with interior surfaces 38, 40 within the chamber 30, the cover 20 may be coupled to the housing using screws 58. Such coupling firmly sandwiches the lamp/ballast/reflector subassembly between the interior surfaces 38, 40 of the housing and the rear surface 64 of the cover 20. In particular, the inner surface 64 of the cover 20 bears against the edges 68 and 70 of the reflector 16 and urges the reflector and ballast 14, respectively, against segments 46, 48 and 42, 44 of interior surfaces 38 and 40.

In the embodiment illustrated in the drawings, the lamp 12 may be placed within the lamp jacket 72 such that end 22 of the lamp extends from end 74 of the lamp jacket and end 24 of the lamp extends from opposite end 76 of the lamp jacket, thereby exposing respective leadwires 26 and 28 for connection to the circuitry of the ballast 14. It will be apparent to those skilled in the art that the lamp 12 may be positioned within the lamp jacket 72 by, for example, inserting the lamp axially through the bore of the lamp jacket before the lamp is connected to the ballast 14. In an alternative embodiment, the lamp jacket may be formed from a resilient material and may have an axially extending slit therethrough which extends from end 74 to end 76 of the lamp jacket and from an outer surface of the lamp jacket to the bore of the lamp jacket. In such an embodiment, the lamp 12 may be forced through the slit and into the bore of the lamp jacket, before or after being connected to the ballast 14.

In the embodiment illustrated in the drawings conductors 82 and 84 are electrically and mechanically connected to the ballast 14 in a conventional manner such as by soldering or welding. Upon assembly of the modular lamp assembly, conductors 82 and 84 may extend through an aperture 86 in the housing 18 for connection to a suitable power source.

When providing a modular lamp assembly of the type which comprises a lamp jacket, the lamp jacket may be coupled to one or more support member which extend from the cover or housing into the housing chamber. For example, the channels 80 of support members 78 may be force fit over opposite ends 74, 76 of the lamp jacket 72 as illustrated in FIG. 2.

Housing 18 may be provided with suitable arms 88 and 90 which facilitate mounting of the housing 18 as desired.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. A modular lamp assembly, comprising:
   an elongated lamp;
   an elongated ballast, said lamp being electrically connected and mechanically coupled by leads to said ballast,
   an elongated reflector positioned between said ballast and said lamp;
   a housing enclosing a chamber and having at least one interior surface, said lamp, said ballast and said reflector positioned in said chamber, said interior surface being structured and arranged to provide support for said ballast and said reflector; and
   a cover having an opening and being removably attached to said housing, said cover enclosing said lamp, ballast and reflector in said housing, and said lamp facing said opening, and said lamp, said ballast and said reflector being unassembled with respect to said housing and said cover.

2. The modular lamp assembly of claim 1 wherein said interior surface mates with said ballast and said reflector.

3. The modular lamp assembly of claim 2 wherein said lamp, said ballast and said reflector are unassembled in relation to said housing, said cover holding in place said ballast and said reflector relative to said interior surface.

4. The modular lamp assembly of claim 1 further including an elongated lamp jacket, said lamp extending through said lamp jacket from one end of said lamp jacket to an opposite another end of said lamp jacket, a first end of said lamp extending from said one end of said lamp jacket and a second end of said lamp extending from said opposite another end of said lamp jacket and wherein said lamp is unassembled in relation to said jacket.

5. The modular lamp assembly of claim 3 further including an elongated lamp jacket, said lamp extending through said lamp jacket from one end of said lamp jacket to an opposite another end of said lamp jacket, a first end of said lamp extending from said one end of said lamp jacket and a second end of said lamp extending from said opposite another end of said lamp jacket and wherein said lamp is unassembled in relation to said jacket.

6. The modular lamp assembly of claim 5 further including at least one support member extending into said chamber, said lamp jacket being removably attached to said support member.

7. The modular lamp assembly of claim 6 wherein said at least one support member extends into said chamber from said cover and includes at least a first support member and a second support member, said lamp jacket being removably attached to said first support member and to said second support member.

8. The modular lamp assembly of claim 7 further including a third support member adjacent and spaced from said first support member and extending from said cover into said chamber, and a fourth support member adjacent and spaced from said second support member and extending from said cover into said chamber, said lamp jacket further being removably attached to said third support member and said fourth support member.

9. The modular lamp assembly of claim 1 wherein said at least one interior surface includes at least (a) a first extension extending from an inner wall of said housing into said chamber and having a first interior surface facing said opening and (b) a second extension extending from said inner wall into said chamber and having a second interior surface facing said opening.

10. The modular lamp assembly of claim 9 wherein said first interior surface and said second interior surface each include (a) a respective first segment which mates with said ballast and (b) a respective second segment which mates with said reflector.

11. The modular lamp assembly of claim 10 wherein said lamp, said ballast and said reflector are unassembled in relation to said housing, said cover holding in place said ballast and said reflector relative to each first segment and each second segment.

12. The modular lamp assembly of claim 11 further including an elongated lamp jacket, said lamp extending through said lamp jacket from one end of said lamp jacket to an opposite another end of said lamp jacket, a first end of said lamp extending from said one end of said lamp jacket and a second end of said lamp extending from said opposite another end of said lamp jacket.

13. The modular lamp assembly of claim 12 further including at least one support member extending into said chamber, said lamp jacket being removably attached to said support member.

14. The modular lamp assembly of claim 13 wherein said at least one support member extends into said chamber from said cover and includes at least a first support member and a second support member, said lamp jacket being removably attached to said first support member and to said second support member.

15. A method for assembling a modular lamp assembly, comprising the steps of:

electrically and mechanically connecting (a) a first leadwire extending from an elongated lamp to an elongated ballast and (b) a second leadwire extending from said lamp to said ballast;

positioning an elongated reflector between said lamp and said ballast, so that said reflector is unassembled in relation to said lamp and said ballast, thereby forming a subassembly comprising said lamp, said ballast and said reflector;

inserting said subassembly into a chamber of a housing; and coupling a cover having an opening to said housing to enclose said subassembly between said housing, and said cover such that said lamp faces said opening.

16. The method of claim 15 wherein said inserting step includes mating said subassembly with at least one interior surface of said housing, and said coupling step includes sandwiching said subassembly between said interior surface and said cover.

17. The method of claim 16 further including the step of placing said lamp within an elongated lamp jacket such that a first end of said lamp extends from one end of said lamp jacket and a second end of said lamp extends from an opposite another end of said lamp jacket.

18. The method of claim 17 further including the step of attaching said lamp jacket to at least one support member which extends into said chamber.

19. The method of claim 18 wherein said attaching step includes attaching (a) a first support member of said at least one support member to said lamp jacket adjacent said one end and (b) a second support member of said at least one support member to said lamp jacket adjacent said opposite another end.

20. The method of claim 16 wherein said mating includes mating said ballast with a first segment of said interior surface and mating said reflector with a second segment of said interior surface.

21. The lamp in claim 1, wherein said reflector is unassembled in relation to said lamp and said ballast.

\* \* \* \* \*